United States Patent
Gole et al.

(10) Patent No.: US 11,640,356 B2
(45) Date of Patent: May 2, 2023

(54) METHODS FOR MANAGING STORAGE OPERATIONS FOR MULTIPLE HOSTS COUPLED TO DUAL-PORT SOLID-STATE DISKS AND DEVICES THEREOF

(71) Applicant: NetApp, Inc., San Jose, CA (US)

(72) Inventors: Abhijeet Gole, Cupertino, CA (US); Rohit Singh, Cary, CA (US)

(73) Assignee: NETAPP, INC., San Jose, CA (US)

( * ) Notice: Subject to any disclaimer, the term of this patent is extended or adjusted under 35 U.S.C. 154(b) by 0 days.

(21) Appl. No.: 17/831,529

(22) Filed: Jun. 3, 2022

(65) Prior Publication Data

US 2022/0300419 A1   Sep. 22, 2022

Related U.S. Application Data

(63) Continuation of application No. 16/911,566, filed on Jun. 25, 2020, now Pat. No. 11,379,360.

(51) Int. Cl.
*G06F 12/02* (2006.01)
*G06F 12/0868* (2016.01)
*G06F 12/0811* (2016.01)
*G06F 12/0873* (2016.01)

(52) U.S. Cl.
CPC ...... *G06F 12/0292* (2013.01); *G06F 12/0246* (2013.01); *G06F 12/0811* (2013.01); *G06F 12/0868* (2013.01); *G06F 12/0873* (2013.01); *G06F 2212/7201* (2013.01)

(58) Field of Classification Search
None
See application file for complete search history.

(56) References Cited

U.S. PATENT DOCUMENTS

| | | | |
|---|---|---|---|
| 11,379,360 B2* | 7/2022 | Gole | G06F 3/0631 |
| 11,386,015 B2* | 7/2022 | Gole | G06F 12/1009 |
| 2017/0192902 A1 | 7/2017 | Hwang et al. | |
| 2020/0097194 A1 | 3/2020 | Grosz | |
| 2020/0225875 A1 | 7/2020 | Oh | |
| 2021/0073141 A1 | 3/2021 | Conklin et al. | |
| 2021/0182166 A1 | 6/2021 | Hahn et al. | |
| 2021/0334006 A1 | 10/2021 | Singh et al. | |
| 2021/0334215 A1 | 10/2021 | Gole et al. | |
| 2021/0334216 A1 | 10/2021 | Gole et al. | |
| 2022/0292031 A1* | 9/2022 | Gole | G06F 12/126 |

* cited by examiner

*Primary Examiner* — Nathan Sadler
(74) *Attorney, Agent, or Firm* — Troutman Pepper Hamilton Sanders LLP (Rochester)

(57) ABSTRACT

Methods, non-transitory machine readable media, and computing devices that manage storage operations directed to dual-port solid state disks (SSDs) coupled to multiple hosts are disclosed. With this technology, context metadata comprising a checksum is retrieved based on a first physical address mapped, in a cached zoned namespace (ZNS) mapping table, to a logical address. The logical address is extracted from a request to read a portion of a file. A determination is made when the checksum is valid based on a comparison to identification information extracted from the request and associated with the file portion. At least the first physical address is replaced in the cached ZNS mapping table with a second physical address retrieved from an on-disk ZNS mapping table, when the determination indicates the checksum is invalid. The file portion retrieved from a dual-port SSD using the second physical address is returned to service the request.

20 Claims, 12 Drawing Sheets

US 11,640,356 B2

METHODS FOR MANAGING STORAGE OPERATIONS FOR MULTIPLE HOSTS COUPLED TO DUAL-PORT SOLID-STATE DISKS AND DEVICES THEREOF

This application is a continuation of U.S. patent application Ser. No. 16/911,566, filed Jun. 20, 2020, which is hereby incorporated by reference in its entirety.

FIELD

This technology relates to data storage systems and, more particularly, to methods and devices for facilitating efficient storage operations using host-managed, dual-port solid-state disks (SSDs) accessible by multiple hosts.

BACKGROUND

Data storage networks often include storage servers and other types of devices hosting applications that store data on solid-state disks (SSDs). Conventional SSDs host a flash translation layer (FTL) and are accessible to only one host device. SSDs have recently been developed that have host managed data placement and dual-ports accessible by multiple host devices (e.g., in a high availability (HA) arrangement). While the flash storage media of SSDs has traditionally been hidden from the host devices, open channel SSDs and zoned SSDs, for example, expose the flash storage media to the host device. Exposing the flash storage media of an SSD to the host device enables applications to optimally place data in specific locations in the flash storage media. Accordingly, the data placement logic of the FTL in these types of deployments can be moved off of the SSD to the host devices.

In an HA arrangement with two host devices, two FTL instances are executed within the operating system software of the host devices. The FTLs implemented in software on the host devices are responsible for translating storage operations directly to the flash storage media of an SSD, which can be a dual-port drive. Managing resources presents a technical problem due, in part, to the concurrent accessibility to the SSD of the two host devices via the two ports. To manage resources, each host device can be provided write-exclusive access to a subset of zones in a zoned namespace (ZNS) of the dual-port SSD, while each host device has read access to each of the zones.

In a multi-host arrangement, hosts own (i.e., have write-exclusive access) a set of zones on the SSD. The hosts also dynamically own virtual volumes. The virtual volume ownership however may change over time. Accordingly, the underlying on-disk or physical storage locations of volume data blocks may change over time because one host may have written the volume blocks onto the set of zones it owns and when that volume ownership moves to another host, the new host may change some of the data block locations to a different set of zones. However, some data blocks may still remain in the zones owned by previous volume owner, and the previous owning host may therefore change the physical locations of data blocks of the volume to another zone it owns.

Explicitly informing the owner host devices of such movement via network communications, or frequently refreshing on-disk mapping tables cached by the FTLs and rendered stale by the data movement, are relatively expensive operations. Accordingly, management of the logical to physical address translations required to accurately service storage operations in environments with dual-ported SSDs managed by multiple host devices is currently inefficient.

DETAILED DESCRIPTION

Figure 1:
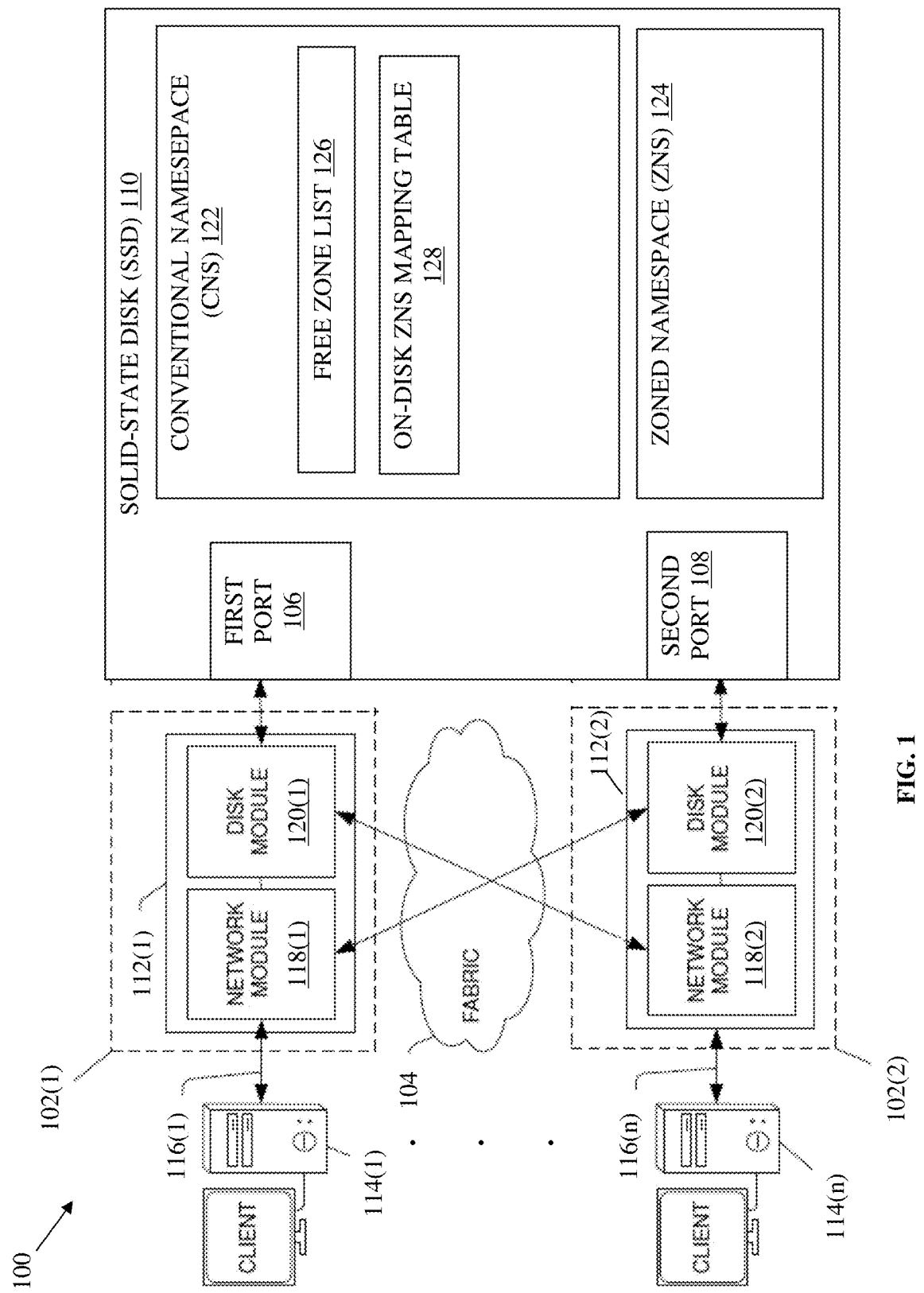
FIG. 1 is a block diagram of a network environment with exemplary host devices coupled to a dual-port solid-state disk (SSD)

A network environment 100 that may implement aspects of the technology described and illustrated herein is shown in FIG. 1. The network environment 100 includes host computing devices 102(1) and 102(2) that are coupled over a data fabric 104 that includes communication network(s) and facilitates communication between the host computing devices 102(1) and 102(2). The host computing device 102(1) and 102(2) are coupled to a first port 106 and a second port 108, respectively, of a host-managed, dual-port solid-state disk (SSD) 110, although any number of other elements or components can also be included in the network environment 100 in other examples. This technology provides a number of advantages including methods, non-transitory computer readable media, and computing devices that more efficiently manage resources by lazily or asynchronous updating cached mapping tables storing logical to physical mappings of zoned namespace (ZNS) zones of the SSD 110.

In this example, nodes 112(1) and 112(2) of the host computing devices 102(1) and 102(2), respectively, can be primary or local storage controllers or secondary or remote storage controllers that provide client devices 114(1)-114(n) with access to data stored within SSD 110. The host computing devices 102(1) and 102(2) of the examples described and illustrated herein are not limited to any particular geographic areas and can be clustered locally and/or remotely. Thus, in one example the host computing devices 102(1) and 102(2) can be distributed over a plurality of storage systems located in a plurality of geographic locations; while in another example a clustered network can include host computing devices 102(1) and 102(2) residing in a same geographic location (e.g., in a single on-site rack).

In the illustrated example, one or more of the client devices 114(1)-114(n), which may be, for example, personal computers (PCs), application servers, computing devices used for storage (e.g., storage servers), or other computers or peripheral devices, are coupled to the host computing devices 102(1) and/or 102(2) by network connections 116(1)-116(n). Network connections 116(1)-116(n) may include a local area network (LAN) or wide area network (WAN), for example, that utilize Network Attached Storage (NAS) protocols, such as a Common Internet Filesystem (CIFS) protocol or a Network Filesystem (NFS) protocol to exchange data packets, a Storage Area Network (SAN) protocol, such as Small Computer System Interface (SCSI) or Fiber Channel Protocol (FCP), an object protocol, such as simple storage service (S3), and/or non-volatile memory express (NVMe), for example.

Illustratively, the client devices 114(1)-114(n) may be general-purpose computers running applications and may interact with the host computing devices 102(1) and 102(2) using a client/server model for exchange of information. That is, the client devices 114(1)-114(n) may request data from the host computing devices 102(1) and 102(2) (e.g., data on the SSD 110 managed by a network storage controller configured to process I/O commands issued by the client devices 114(1)-114(n)), and the host computing devices 102(1) and 102(2) may return results of the request to the client devices 114(1)-114(n) via the network connections 116(1)-116(n).

While the host computing devices 102(1) and 102(2) are disclosed in this example as including only SSD 110 for storage, multiple SSDs, including multiple dual-port SSDs, and other types of mass storage devices including hard disk drives (HDDs), magnetic disk drives, and any other similar media adapted to store information, including, for example, data and/or parity information, can also be utilized by the host computing devices 102(1) and 102(2) in other examples. Accordingly, the dual-port SSD 110 can represent one or multiple dual-port SSDs, optionally coupled to a shelf (not illustrated).

The nodes 112(1) and 112(2) of the host computing devices 102(1) and 102(2), respectively, can include network or host nodes that are interconnected as a cluster to provide data storage and management services, such as to an enterprise having remote locations, cloud storage, etc., for example. Such nodes 112(1) and 112(2) can be attached to the data fabric 104 at a connection point, redistribution point, or communication endpoint, for example. One or more of the host computing devices 112(1) and 112(2) may be capable of sending, receiving, and/or forwarding information over a network communications channel, and could comprise any type of device that meets any or all of these criteria.

In an example, the nodes 112(1) and 112(2) may be configured according to a disaster recovery or high availability configuration whereby a surviving takeover node provides switchover access to the SSD 110 in the event a failure or planned takeover event occurs (e.g., the node 112(1) provides client device 114(n) with switchover data access to SSD 110). Additionally, while two nodes and host computing devices are illustrated in FIG. 1, any number of nodes or host computing devices can be included in other examples in other types of configurations or arrangements.

As illustrated in the network environment 100, nodes 112(1) and 112(2) can include various functional components that coordinate to provide a distributed storage architecture. For example, the nodes 112(1) and 112(2) can include network modules 118(1) and 118(2) and disk modules 120(1) and 120(2), respectively. Network modules 118(1) and 118(2) can be configured to allow the nodes 112(1) and 112(2) (e.g., network storage controllers) to connect with client devices 114(1)-114(n) over the storage network connections 116(1)-116(n), for example, allowing the client devices 114(1)-114(n) to access data stored in the network environment 100.

Further, the network modules 118(1) and 118(2) can provide connections with one or more other components through the data fabric 104. For example, the network module 118(1) of node 112(1) can access the SSD 110 by sending a request via the data fabric 104 through the disk module 120(2) of node 112(2). The cluster fabric 104 can include one or more local and/or wide area computing networks embodied as Infiniband, Fibre Channel (FC), or Ethernet networks, for example, although other types of networks supporting other protocols can also be used.

In some examples, the SSD 110 can be locally-attached (e.g., via a system bus). In other examples, disk modules 120(1) and 120(2) can be configured to connect the SSD 110 to the nodes 112(1) and 112(2). In some examples, disk modules 120(1) and 120(2) communicate with the SSD 110 according to Fabric protocols, such as NVMeoF, for example, although other protocols can also be used. Thus, as seen from an operating system on either of nodes 112(1) or 112(2), the SSD 110 can appear as locally attached in these examples. In this manner, different nodes 112(1) and 112(2) may access data blocks, files, or objects through the operating system, rather than expressly requesting abstract files.

While the network environment 100 illustrates an equal number of network modules 118(1) and 118(2) and disk modules 120(1) and 120(2), other examples may include a differing number of these modules. For example, there may be a plurality of network and disk modules interconnected in a cluster that do not have a one-to-one correspondence between the network and disk modules. That is, different nodes can have a different number of network and disk modules, and the same node can have a different number of network modules than disk modules.

Further, one or more of the client devices 114(1)-114(n) can be networked with the nodes 112(1) and 112(2), over the storage connections 116(1)-116(n). As an example, respective client devices 114(1)-114(n) that are networked may request services (e.g., exchanging of information in the form of data packets) of nodes 112(1) and 112(2), and the nodes 112(1) and 112(2) can return results of the requested services to the client devices 114(1)-114(n). In one example, the client devices 114(1)-114(n) can exchange information with the network modules 118(1) and 118(2) residing in the nodes 112(1) and 112(2) (e.g., network hosts) in the host computing devices 102(1) and 102(2), respectively.

In one example, the host computing devices 102(1) and 102(2) host aggregates corresponding to physical local and/or remote data storage devices, such as flash media in the SSD 110, for example. The SSD 110 can be part of a mass storage device, such as disks of a disk array. In this particular example, the SSD 110 is a dual-port SSD including the first port 106 and the second port 108, although another number of ports can be provided in other examples. The SSD 110 optionally includes device memory (e.g., dynamic random access memory (DRAM) and flash media), which includes a conventional namespace (CNS) 122 and a zoned namespace (ZNS) 124. Accordingly, the SSD 110 supports the ZNS 124 that consists of a set of logical zones that can be read, written, or erased as a unit as well as the CNS 122 that support random block read/write.

The CNS 122 includes an optional free zone list 126 and an on-disk ZNS mapping table 128. The on-disk ZNS mapping table 128 can be located at a reserve location in the CNS 122 known by the host computing devices 102(1) and 102(2) prior to, or exchanged by the host computing devices 102(1) and 102(2) during, an initialization process. In other examples, the CNS can include CNS mapping table(s) that store entries that include translations from logical address (e.g., logical block address (LBA) or logical block number) to physical address (e.g., in user data maintained on the flash storage media in the CNS 122 of the SSD 110).

The ZNS 124 stores data in zones that correspond to logical address ranges and are written sequentially and, if written again, are reset. The on-disk ZNS mapping table 128 includes entries that are indexed by logical address and identify a previous zone, if any, and a current zone. Entries that include an indication of a previous zone are considered open and entries that do not include a previous zone are considered finished and can be read from but not written to.

Since zones must be written to as a unit, the previous zone refers to a previously-completed or finished zone that was subsequently reopened (e.g., written to), requiring that the data of the previous zone be rewritten to the current, open zone. Upon finishing an open zone (e.g., by writing the new data and any data from the previous zone), the previous zone is optionally added to the free zone list 126 and the entry in the on-disk ZNS mapping table 128 is updated to remove the indication of the previous zone. The previous zone is now free because all of the data that was not overwritten was moved to the new, current zone, which is now considered to be finished.

The aggregates in this example include volumes which are virtual data stores or storage objects that define an arrangement of storage and one or more file systems within the network environment 100. Volumes can span a portion of a disk or other storage device, a collection of disks, or portions of disks, for example, and typically define an overall logical arrangement of data storage. In one example, volumes can include stored user data as one or more files, blocks, or objects that reside in a hierarchical directory structure within the volumes.

Volumes are typically configured in formats that may be associated with particular storage systems, and respective volume formats typically comprise features that provide functionality to the volumes, such as providing the ability for volumes to form clusters, among other functionality. Optionally, one or more of the volumes can be in composite aggregates and can extend between the SSD 110 and one or more other storage devices and, optionally, one or more cloud storage device(s) (not shown) to provide tiered storage, for example, and other arrangements can also be used in other examples.

To facilitate access to data stored on the SSD 110, a file system may be implemented that logically organizes the information as a hierarchical structure of directories and files. In this example, respective files may be implemented as a set of disk blocks of a particular size that are configured to store information, whereas directories may be implemented as specially formatted files in which information about other files and directories are stored.

Data can be stored as files or objects within a physical volume and/or a virtual volume, which can be associated with respective volume identifiers. The physical volumes correspond to at least a portion of physical storage devices, such as the SSD 110, which can be part of a Redundant Array of Independent (or Inexpensive) Disks (RAID system) whose address, addressable space, location, etc. does not change. Typically the location of the physical volumes does not change in that the range of addresses used to access it generally remains constant.

Virtual volumes, in contrast, can be stored over an aggregate of disparate portions of different physical storage devices. Virtual volumes may be a collection of different available portions of different physical storage device locations, such as some available space from disks, for example. It will be appreciated that since the virtual volumes are not "tied" to any one particular storage device, virtual volumes can be said to include a layer of abstraction or virtualization, which allows it to be resized and/or flexible in some regards.

Further, virtual volumes can include one or more logical unit numbers (LUNs), directories, Qtrees, files, and/or other storage objects, for example. Among other things, these features, but more particularly the LUNs, allow the disparate memory locations within which data is stored to be identified, for example, and grouped as data storage unit. As such, the LUNs may be characterized as constituting a virtual disk or drive upon which data within the virtual volumes is stored within an aggregate. For example, LUNs are often referred to as virtual drives, such that they emulate a hard drive, while they actually comprise data blocks stored in various parts of a volume.

Figure 2:
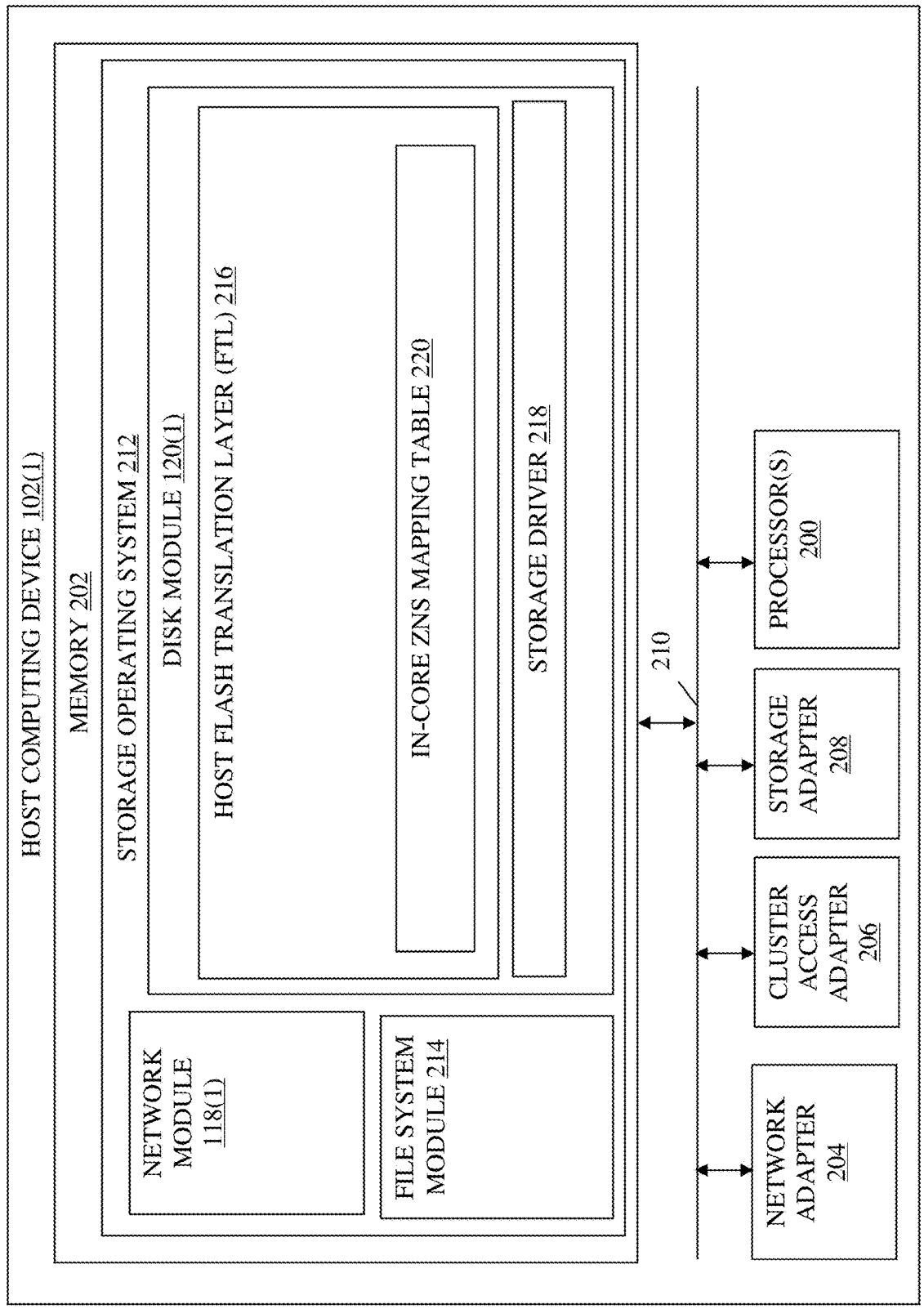
FIG. 2 is a block diagram of an exemplary host device.

Referring to FIG. 2, host computing device 102(1) in this particular example includes processor(s) 200, a memory 202, a network adapter 204, a cluster access adapter 206, and a storage adapter 208 interconnected by a system bus 210. The host computing device 102(1) also includes a storage operating system 212 installed in the memory 202 that includes a file system module 214, the network module 118(1), and the disk module 120(1), although other applications and/or module can also be provided as part of the operating system 212.

The disk module 120(1) further includes a host flash translation layer (FTL) 216 and a storage driver 218 in this example, and the host FTL 216 includes an in-core ZNS mapping table 220. The in-core ZNS mapping table 220 is a cached versions of the on-disk ZNS mapping table 128 illustrated in FIG. 1. In other examples, the host FTL 216 can include an in-core CNS mapping table that is a cached version of an on-disk CNS mapping table hosted by the SSD 110, random and/or sequential map modules, and/or a router, and other modules and/or data structures can also be included as part of the host FTL 216. In some examples, the host computing device 102(2) is substantially the same in structure and/or operation as host computing device 102(1), although the host computing device 102(2) can also include a different structure and/or operation in one or more aspects than the host computing device 102(1).

The network adapter 204 in this example includes the mechanical, electrical and signaling circuitry needed to connect the host computing device 102(1) to one or more of the client devices 114(1)-114(n) over network connections 116(1)-116(n), which may comprise, among other things, a point-to-point connection or a shared medium, such as a local area network. In some examples, the network adapter 204 further communicates (e.g., using TCP/IP) via the data fabric 104 and/or another network (e.g. a WAN) with cloud storage device(s) (not shown) to process storage operations associated with data stored thereon.

The storage adapter 208 cooperates with the storage operating system 212 executing on the host computing device 102(1) to access information requested by the client devices 114(1)-114(n) (e.g., to access data on the SSD 110). In some examples, the SSD 110 stores a cache for data maintained on one or more other data storage devices (not shown) coupled to the host computing device 102(1). The data maintained on the other data storage devices may be stored on any type of attached array of writeable media such as magnetic disk drives, flash memory, and/or any other similar media adapted to store information.

In the data storage devices and/or the SSD 110, information can be stored in data blocks. The storage adapter 208 can include I/O interface circuitry that couples to the data storage devices over an I/O interconnect arrangement, such as a storage area network (SAN) protocol (e.g., Small Computer System Interface (SCSI), Internet SCSI (iSCSI), hyperSCSI, Fiber Channel Protocol (FCP)). Information retrieved by the storage adapter 208 and can be processed by the processor(s) 200 (or the storage adapter 208 itself) prior to being forwarded over the system bus 210 to the network adapter 204 (and/or the cluster access adapter 206 if sending to another node) where the information is formatted into a data packet and returned to a requesting one of the client devices 114(1)-114(n) and/or sent to another node attached via the data fabric 104.

In some examples, the storage driver 218 in the storage operating system 212 interfaces with the storage adapter 208 to facilitate interactions with the data storage devices. In particular, the storage driver 218 is used to communicate device commands and read/write requests to disk devices (not shown), as well as the SSD 110.

The storage operating system 212 can also manage communications for the host computing device 102(1) among other devices that may be in a clustered network, such as attached to a data fabric 104. Thus, the host computing device 102(1) can respond to client requests to manage data on the SSD 110, other data storage devices, or cloud storage device(s) (e.g., or additional clustered devices) in accordance with the client requests.

The file system module 214 of the storage operating system 212 can establish and manage one or more filesystems including software code and data structures that implement a persistent hierarchical namespace of files and directories, for example. As an example, when a new data storage device (not shown) is added to a clustered network system, the file system module 214 is informed where, in an existing directory tree, new files associated with the new data storage device are to be stored. This is often referred to as "mounting" a filesystem.

In the example host computing device 102(1), the memory 202 can include storage locations that are addressable by the processor(s) 200 and adapters 204, 206, and 208 for storing related software application code and data structures. The processor(s) 200 and adapters 204, 206, and 208 may, for example, include processing elements and/or logic circuitry configured to execute the software code and manipulate the data structures.

The storage operating system 212 also invokes storage operations in support of a file service implemented by the host computing device 102(1). Other processing and memory mechanisms, including various computer readable media, may be used for storing and/or executing application instructions pertaining to the techniques described and illustrated herein. For example, the storage operating system 212 can also utilize one or more control files (not shown) to aid in the provisioning of virtual machines.

In this particular example, the storage operating system 212 also includes the host flash translation layer (FTL) 216, which is responsible for translating the storage operations (i.e., read/write requests from applications) directly to accesses to flash media (e.g., not—and (NAND) flash memory) of the SSD 110. Accordingly, the host FTL 216 handles and manages the write idiosyncrasies and restrictive rules of the flash storage media. In examples in which the host FTL 216 includes a router, random map module, and/or a sequential map module, the router processes incoming storage operations and determines whether to route the storage operations to the random map module or the sequential map module. The routing of a storage operation can be based on a characteristic(s) or parameter(s) of the storage operation, including whether a logical address in the storage operation falls within a range allocated to the CNS 122 or ZNS 124, for example.

The random map module manages the storage operations received from the router that are directed to the CNS 122 and the sequential map module manages storage operations received from the router that are directed to the contents of the ZNS 124. The sequential map module utilizes the in-core ZNS mapping table 220, which is synchronized with the on-disk ZNS mapping table 128 to service read and write operations to the ZNS 124. In other examples, storage operations can be routed and/or processed by the host FTL 216 in other ways.

The examples of the technology described and illustrated herein may be embodied as one or more non-transitory computer readable media (e.g., memory 202) having machine or processor-executable instructions stored thereon for one or more aspects of the present technology, which when executed by the processor(s) 200, cause the processor(s) 200 to carry out the steps necessary to implement the methods of this technology, as described and illustrated with the examples herein. In some examples, the executable instructions are configured to perform one or more steps of a method, such as one or more of the exemplary methods described and illustrated below with reference to FIGS. 3-8, for example.

Figure 3:
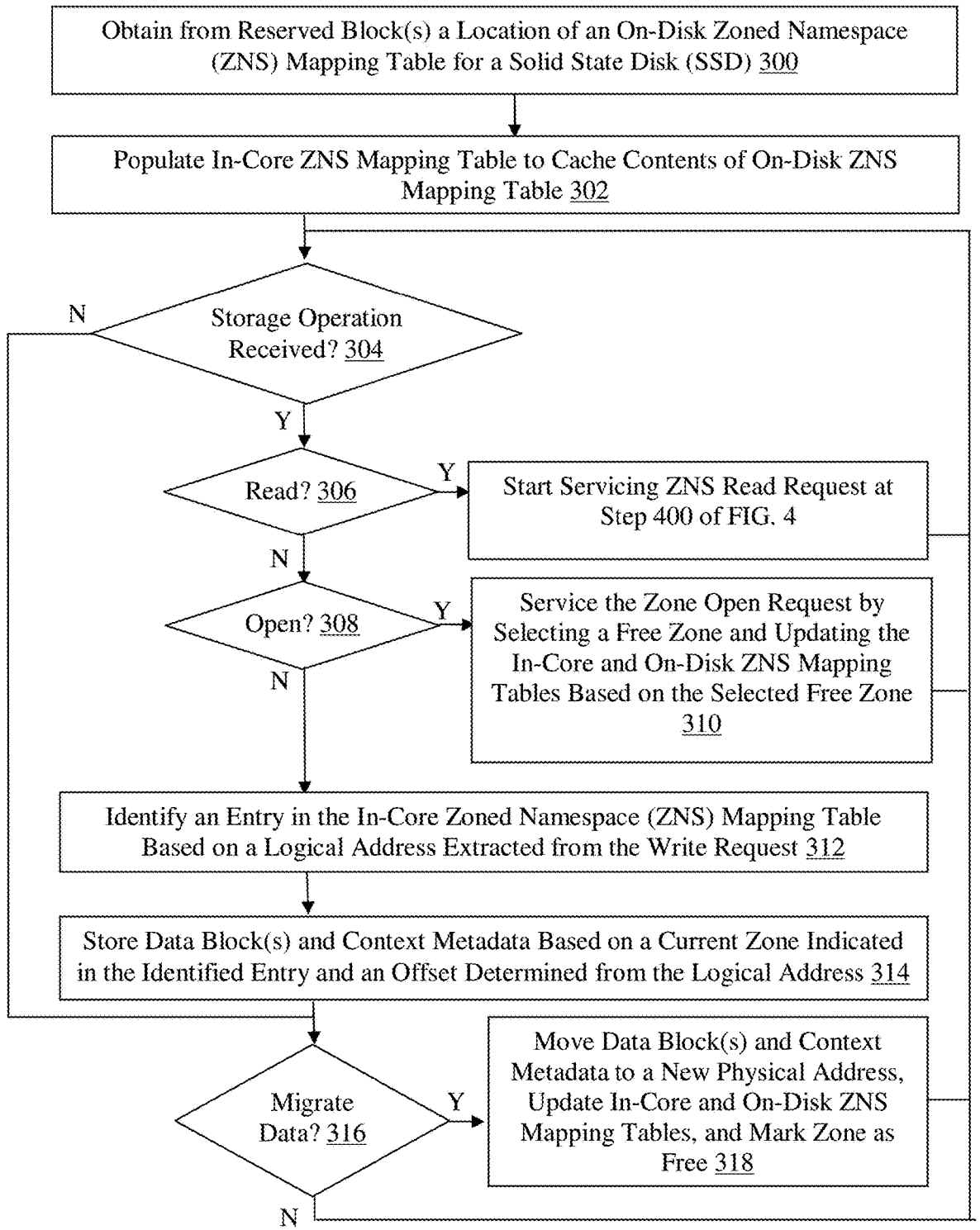
FIG. 3 is a flowchart of an exemplary method for processing storage operations directed to a dual-port SSD accessible by multiple host devices.

Referring more specifically to FIG. 3, a flowchart of an exemplary method for processing storage operations directed to the dual-port SSD 110 accessible by the host computing devices 102(1) and 102(2) is illustrated. While the exemplary methods of FIGS. 3-8 are described and illustrated herein as being performed by the host computing device 102(1), in some examples, the host computing device 102(2) is configured in the same manner as the host computing device 102(1), although other configurations can also be used.

In step 300 in this example, the host FTL 216 of the host computing device 102(1) obtains from the SSD 110 the location of the on-disk ZNS mapping table 128, as part of an initialization process for the host computing device 102(1). The initialization process can be performed upon initial start-up and/or following a failover, for example. In some examples, the host computing device 102(1) is preconfigured with an indication of reserved block(s) in the CNS 122 of the SSD 110 at which the mapping table location will be stored, although other methods for retrieving the mapping table location can also be used. In these examples, the host FTL 216 retrieves the mapping table location from the reserved block(s).

In step 302, the host FTL 216 of the host computing device 102(1) synchronizes the in-core ZNS mapping table 220 with the on-disk ZNS mapping table 128 The in-core ZNS mapping table 220 and on-disk ZNS mapping table store logical-to-physical (L2P) mappings or translations between logical zones and physical zones that correspond with storage locations in the ZNS 124 and on the SSD 110. Accordingly, the in-core ZNS mapping table 220 is alternately referred to herein as an L2P table. Subsequent to the synchronization, the in-core ZNS mapping table 220 will include the translations for physical zones owned by the host computing device 102(2), as maintained by the host computing device 102(2) in the shared on-disk ZNS mapping table 128.

In step 304, the host FTL 216 of the host computing device 102(1) determines whether a storage operation is received that is directed to the ZNS 124, such as from one of the client devices 114(1)-114(n), for example. In this example, the storage operation is determined by the host FTL (e.g., a router of the host FTL 216) to be directed to the ZNS 124 based on a logical address or zone number identified in the storage operation, a type of the storage operation (e.g., a request to open a zone), or any other characteristic(s) or parameter(s) of the storage operation. If the host FTL 216 determines that a storage operation directed to the ZNS 124 is received, then the Yes branch is taken to step 306.

In step 306, the host FTL 216 of the host computing device 102(1) determines whether the storage operation is a read request based on an indication of the type of operation included with the request, for example. If the host FTL 216 determines that the storage operation is a read request, then the Yes branch is taken to step 400 of FIG. 4 in which the SMAP module 226 begins servicing the read request that is directed to the ZNS 124.

Figure 4:
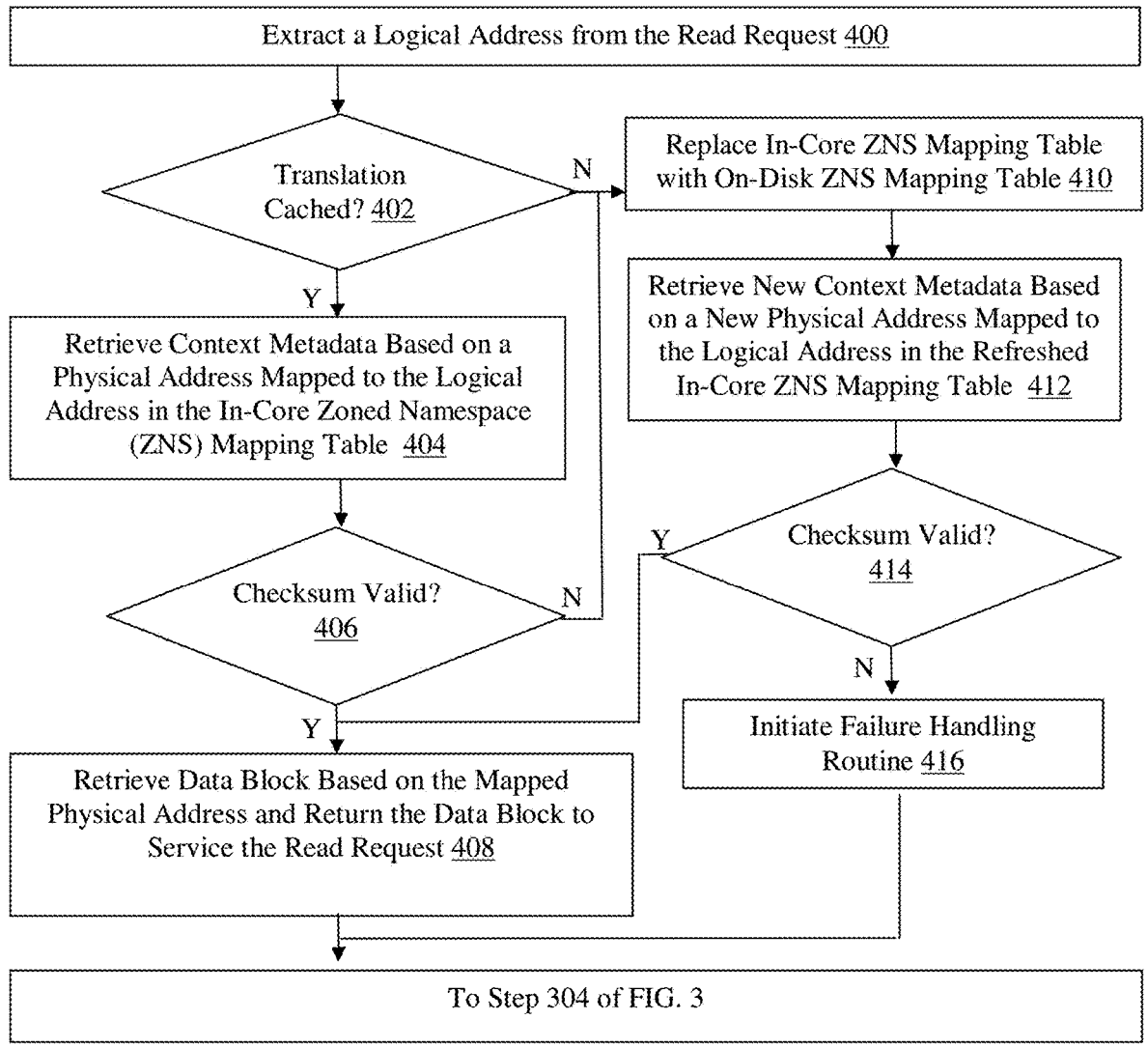
FIG. 4 is a flowchart of an exemplary method for servicing read requests to a zoned namespace (ZNS) of a dual-port SSD.

Accordingly, in FIG. 4 a flowchart of an exemplary method for servicing read requests directed to the ZNS 124 of the SSD 110 is illustrated. In step 400 in this example, the FTL 216 of the host computing device 102(1) extracts a logical address from the received read request. In this example, the read requests is for a particular data block corresponding to the logical address, although other types of read requests for other types of data, including files, objects, and/or multiple data blocks, for example, can also be used in other examples.

In step 402, the FTL 216 of the host computing device 102(1) determines whether a translation is cached for the extracted logical address. The host computing device 102(1) can attempt to identify an entry in the in-core ZNS mapping table 220 based on the logical address to determine whether the translation is cached. The entry can be determined in one example based on dividing the logical address by a zone size or number of zones in the ZNS 124, although other methods of identifying the entry can also be used.

Generally, a corresponding entry will exist for data previously written by the host computing device 102(1), which will have populated the in-core mapping table 220 with the translation, as described and illustrated in more detail below. A corresponding entry may also exist for data written to a zone owned by the host computing device 102(2) prior to a most recent refresh of the in-core ZNS mapping table 220 by the host computing device 102(1)

A corresponding entry may not be cached if the associated data was written by the host computing device 102(2) after the most recent refresh of the in-core ZNS mapping table 220 by the host computing device 102(1), for example, although the translation may not be cached for other reasons. However, if an entry corresponding to the extracted logical address exists in the in-core ZNS mapping table 220, then the Yes branch is taken to step 404.

In step 404, the FTL 216 of the host computing device 102(1) retrieves context metadata from the ZNS 124 of the SSD 110 based on a physical address in the identified entry of the in-core ZNS mapping table 220, which corresponds or is mapped to the logical address. The context metadata can be a separate from the associated data block, prepended or appended to the associated data block, or otherwise linked to the associated data block located at the physical address.

In step 406, the FTL 216 of the host computing device 102(1) determines whether a checksum associated with the data block is valid. The checksum in this example is based on at least a portion of the retrieved context metadata. Accordingly, the checksum can include a file identifier, a volume block number, and/or a file block number, for example, although other types of metadata or other information can also be included in the checksum associated with the data block.

The host computing device 102(1) determines the validity of the checksum by comparing the data that comprises the checksum with the corresponding data extracted from the read request. In one example, the host computing device 102(1) extracts a file identifier and a file block number from the read request, which are compared to a file identifier and a file block number of the checksum determined from the retrieved context metadata. Other types of information can be compared and other methods for determining the validity of the checksum can also be used in other examples. If the host computing device 102(1) determines that the checksum is valid, then the Yes branch is taken to step 408.

In step 408, the FTL 216 of the host computing device 102(1) retrieves the requested data block from the ZNS 124 of the SSD 110 based on the physical address mapped to the logical address extracted from the read request, which was used to retrieve the context metadata in step 404. In other examples, the data block can be retrieved along with the context metadata in step 404 and discarded, if necessary (e.g., if the checksum is determined to be invalid, as described and illustrated in more detail below). After retrieving the data block from the SSD 110, the host computing device 102(1) returns the data block to the requesting one of the client devise 104(1)-104(n) in order to service the read request. However, if the host computing device 102(1) determines that the checksum is not valid, then the No branch is taken from step 406 to step 410.

In step 410, the FTL 216 of the host computing device 102(1) replaces the in-core ZNS mapping table 220 with a copy of the on-disk ZNS mapping table 128 in order to refresh the in-core ZNS mapping table 220. While in this example, the entire in-core ZNS mapping table 220 is refreshed, in other examples, the host computing device 102(1) can replace the physical address in the entry identified in step 402 with a new physical address mapped to the logical address, which was extracted from the read request in step 400, in the on-disk ZNS mapping table 128.

In one example described and illustrated in more detail below with reference to FIGS. 5-8, the checksum can be invalid because the host computing device 102(2) moved the data block from an old zone to a new zone. After migrating the data block to the new zone, the host computing device 102(2) will have updated the on-disk ZNS mapping table 128, as described and illustrated in more detail below with reference to step 318 of FIG. 3. Subsequent reuse of the old zone to store a new data block, for example, will have rendered stale the translation in the entry associated with the logical address in the in-core ZNS mapping table 220, and the checksum associated with the entry will be invalid. In other examples, the checksum can be invalid for other reasons.

In step 412, the FTL 216 of the host computing device 102(1) retrieves new context metadata based on a new physical address mapped to the logical address in the refreshed in-core ZNS mapping table 220. The new context metadata can be retrieved as described and illustrated in more detail earlier with reference to step 404, for example.

In step 414, the FTL 216 of the host computing device 102(1) determines whether the checksum is valid, such as described and illustrated in more detail earlier with reference to step 406. By replacing the in-core ZNS mapping table in step 410, the reuse of the zone subsequent to the migration of the data block by the host computing device 102(2) in the above example will be reflected. In particular, the checksum determined from the context metadata retrieved based on the physical address mapped to the logical address in the replaced entry of the in-core ZNS mapping table 220 should now be valid absent an error condition. If the host computing device 102(1) determines that the checksum is not valid, then the No branch is taken to step 416.

In step 416, the FTL 216 of the host computing device 102(1) initiates a failure handling procedure. Accordingly, the host computing device 102(1) can return an error message in response to the read request, prompt a new read request from the one of the client devise 104(1)-104(n), initiates another iteration of steps 410-414, or perform any other action as part of a failure handling routine.

However, if the host computing device 102(1) determines in step 414 that the checksum is now valid, then the Yes branch is taken to step 408, and the host computing device 102(1) retrieves a data block based on the mapped physical address and returns the data block to service the read request, as described and illustrated in more detail earlier. Optionally, the host computing device 102(1) could have retrieved the data block along with the new context metadata in step 412 in other examples. Subsequent to retrieving the data block in step 408, or initiating the failure handling routine in step 416, the host computing device proceeds to step 304 of FIG. 3.

In step 304, the host FTL 216 of the host computing device 102(1) again determines whether a storage operation directed to the ZNS 124 is received, such as from one of the client devices 104(1)-104(n). If the host computing device 102(1) determines a storage operation is received, then the Yes branch is taken to step 306.

In step 306, the host FTL 216 of the host computing device 102(1) again determines whether the received storage operation is a read request. In this iteration, the host computing device 106(1) determines that the storage operation is not a read request and the No branch is taken to step 308.

In step 308, the host FTL 216 of the host computing device 102(1) determines whether the storage operation is a zone open request based on characteristic(s) or a type of the operation, for example. If the host computing device 102(1) determines that the storage operation is a zone open request, then the Yes branch is taken to step 310.

In step 310, the host FTL 216 of the host computing device 102(1) services the zone open request by selecting a free zone. The free zone can be selected from the free zone list 126, for example, which can be populated as described in more detail below. Since the free zone list 126 is accessible to both host computing devices 102(1) and 102(2), the selection can be managed by atomic operation(s) that update the free zone list 126 to remove an indication of the selected free zone. Other methods of identifying the free zone to use to service the open zone request can also be used in other examples.

The host computing device 102(1) then opens the selected zone for writing and inserts an entry into the in-core ZNS mapping table 220 and the on-disk ZNS mapping table 128. The inserted entry includes an indication of the free zone selected from the free zone list 126, for example. The entry is inserted at a location determined from contents of the open zone request (e.g., a logical address). Subsequent to servicing the zone open request, the host computing device 102(1) proceeds back to step 304 in this example. However, if the host computing device 102(1) determines in step 308 that the storage operation is not a zone open request, then the No branch is taken to step 312.

In step 312, the host FTL 216 of the host computing device 102(1) identifies an entry in the in-core ZNS mapping table 220 based on a logical address extracted from the write request. The entry can be identified as described and illustrated in more detail earlier with reference to step 400 of FIG. 4, for example. In this example, if the storage operation is not a read request or a zone open request, then the storage operation is a write request, although other types of storage operations can be received and processed in other examples.

In step 314, the host FTL 216 of the host computing device 102(1) services the write request based on a current zone indicated in the entry of the in-core ZNP mapping table 200 identified in step 312 and an offset determined from the logical address. In this example, a first write request to a zone in the ZNS 124 is preceded by an open zone request. Accordingly, a write request will be directed to a zone identified as the current zone in the identified entry of the in-core ZNS mapping table 220. The host computing device 102(1) services the write request by writing the data and context metadata associated with the write request to the physical location in the ZNS 124 that corresponds to the identified current zone and the determined offset. Subsequent to servicing the write request, or if the host computing device 102(1) determines in step 304 that a storage operation has not been received and the No branch is taken, then the host computing device 102(1) proceeds to step 316.

In step 316, the host FTL 216 of the host computing device 102(1) determines whether any data should be moved or migrated to a different zone in the ZNS 124. The determination whether data requires migration can be based on any number of reasons such as the application of a data protection or security policy. The determination whether data requires migration can be based on any number of reasons such as the application of a data protection or security policy, for example. If the host computing device 102(1) determines that data should be migrated, then the Yes branch is taken to step 318.

In step 318, the host FTL 216 of the host computing device 102(1) moves the data and associated context metadata to a new physical address, updates the in-core ZNS mapping table 220 and the on-disk ZNS mapping table 128 to reflect the mapping of the associated logical address to the new physical address, and marks the zone as free, such as by adding an indication of the zone to the free zone list 126, for example.

While the on-disk ZNS mapping table 220 is updated by the host computing device 102(1), an in-core mapping table of the host computing device 102(2) will not reflect the update until the entry of the mapping table is refreshed, such as described and illustrated in more detail above with reference to step 410 of FIG. 4, for example. However, the checksum determined from the context metadata associated with the migrated data will still be valid until the corresponding zone, which was marked as free in step 318, is reused.

Subsequent to moving the data in step 318, or if the host computing device 102(1) determines in step 316 that no data currently requires migration and the No branch is taken, then the host computing device 102(1) proceeds back to step 304 and again determines whether a storage operation is received, as described and illustrated in more detail earlier. Accordingly, the host computing device 102(1) in this particular example effectively waits for a storage operation to be received or data to require migration. While step 316 is illustrated as occurring subsequent to other steps in FIG. 3, step 316, as well as one or more other of steps 300-314 and/or 318, can occur in parallel in other examples.

Figure 5:
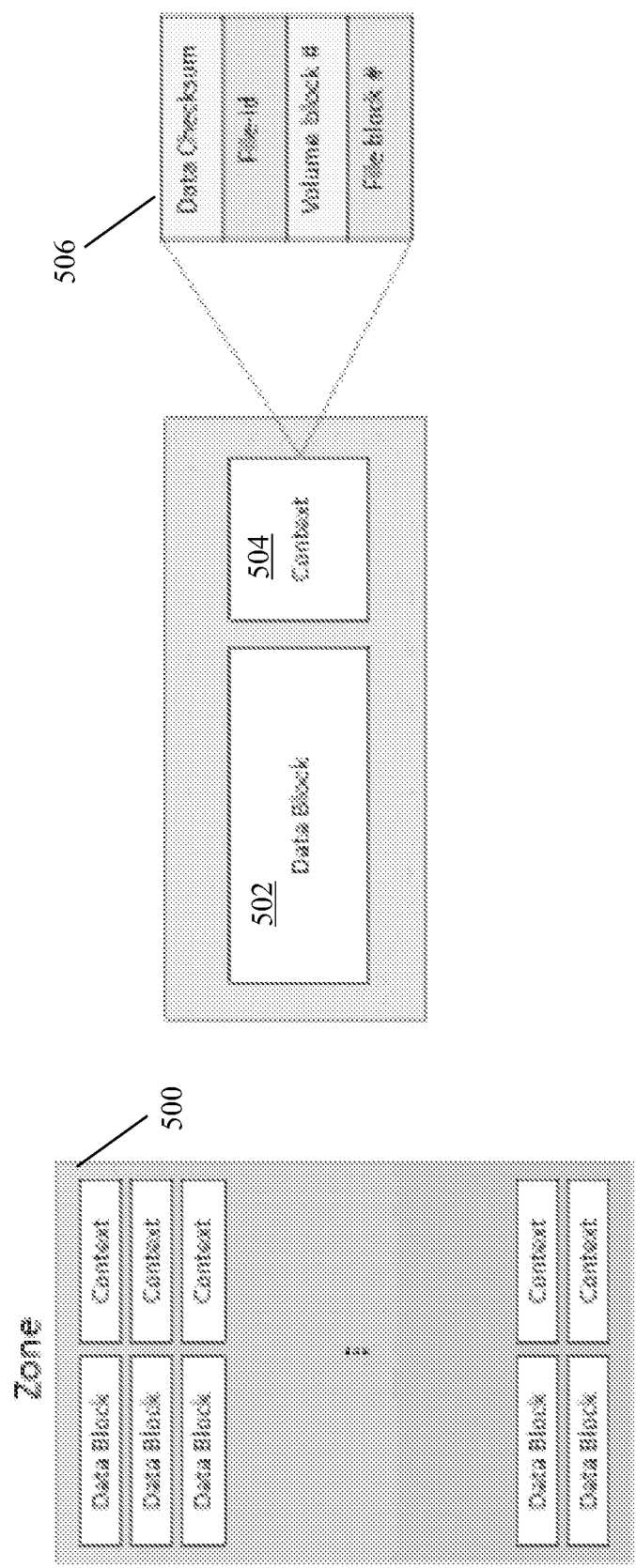
FIG. 5 is a block diagram of a layout of an exemplary zone and associated contents within a ZNS of a dual-port SSD.

Referring to FIG. 5, a block diagram of a layout of an exemplary zone 500 and associated contents within the ZNS 124 of the SSD 110 is illustrated. In this example, the zone 500 includes a plurality of data blocks including data block 502, which has associated context metadata 504. A checksum 506 can be generated from the context metadata 504 and includes a file identifier, a volume block number, and a file block number, although the checksum can be generated based on other portions of the context metadata 504 in other examples.

Figure 6:
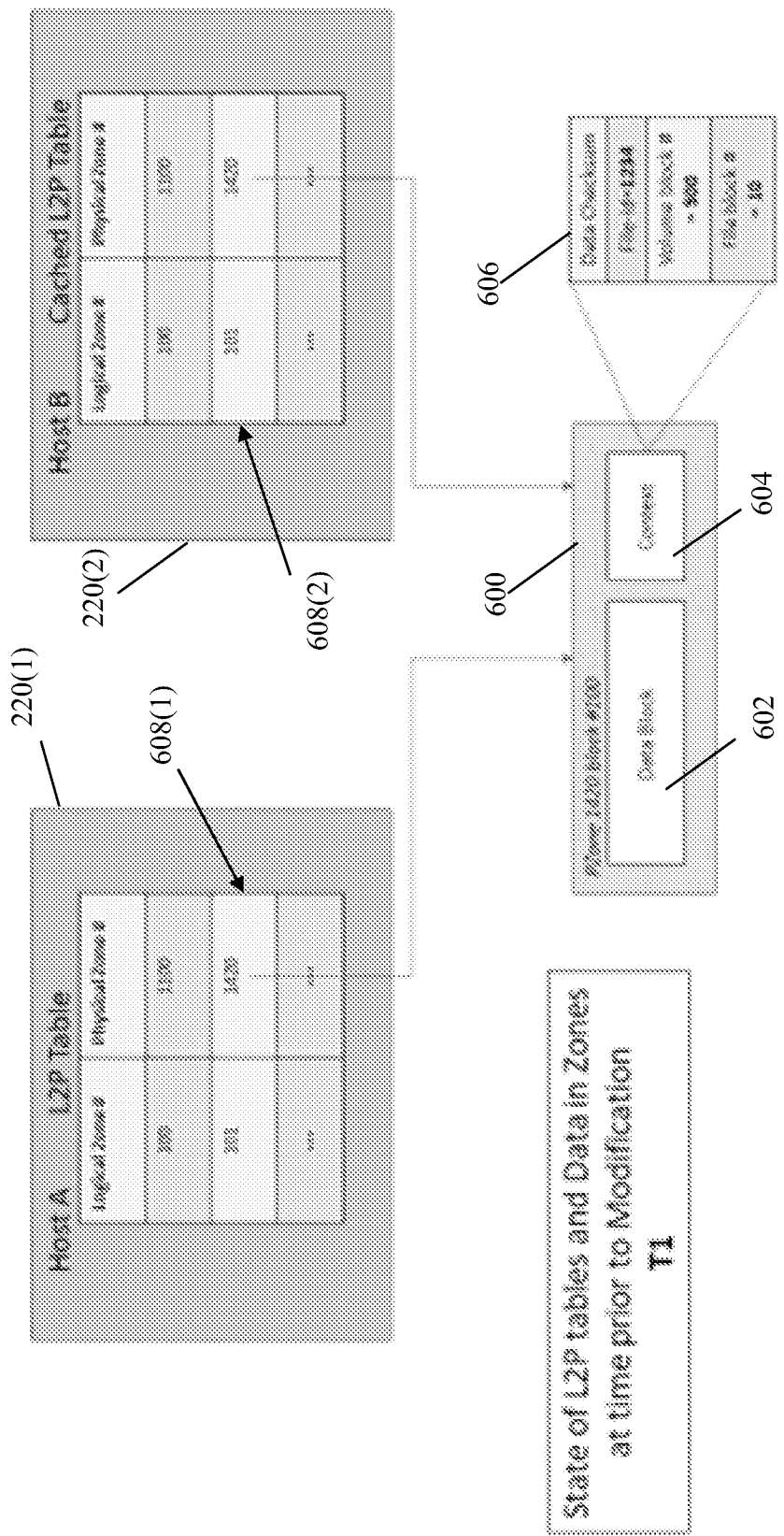
FIG. 6 is a block diagram of an exemplary state of in-core ZNS mapping tables of two host devices in relation to another exemplary zone within a ZNS of a dual-port SSD.

Referring to FIG. 6, a block diagram of an exemplary state of in-core ZNS mapping tables 220(1) and 220(2) of host computing devices 102(1) and 102(2), respectively, in relation to another exemplary zone 600 within the ZNS 124 of the SSD 110 is illustrated. In this example, the zone 600 has a physical zone number physical address of "1420" and stores a data block 602 and associated context metadata 604. The checksum 606 can be generated from the context metadata 600 and includes a file identifier of "1234", a volume block number of "500", and a file block number of "10". At time T1, the in-core ZNS mapping tables 220(1) and 220(2) have respective entries 608(1) and 608(2) that reflect the mapping or translation of a logical zone number or logical address of "101" to the physical zone number "1420" associated with zone 600.

Figure 7:
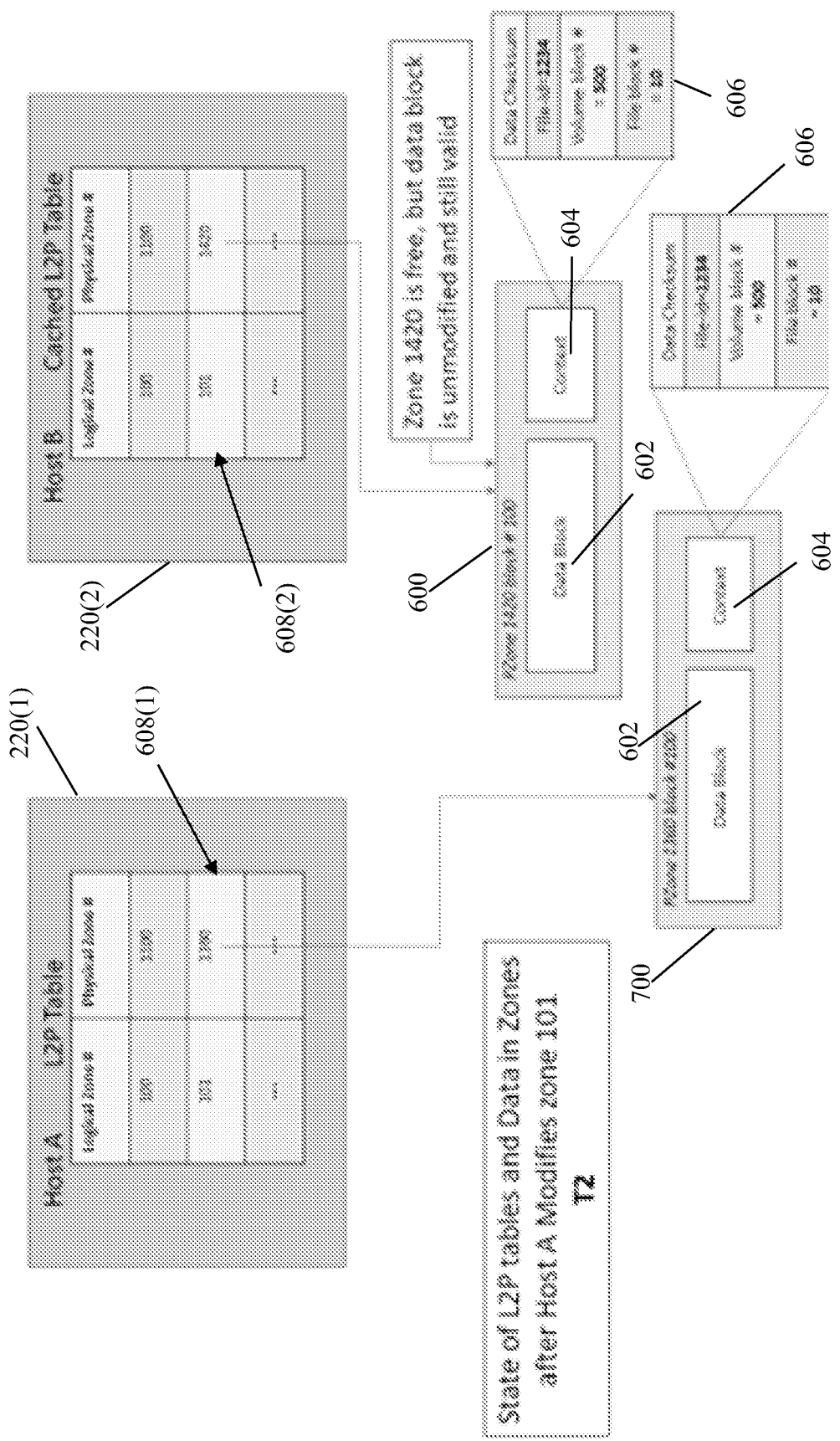
FIG. 7 is a block diagram of another exemplary state of the in-core ZNS mapping tables of two host devices after movement by one of the host devices of a data block associated with the other exemplary zone of FIG. 6.

Referring to FIG. 7, a block diagram of another exemplary state of the in-core ZNS mapping tables 220(1) and 220(2) of host computing devices 102(1) and 102(2), respectively, after movement by the host computing device 102(1) of data block 600 associated with the zone 600 is illustrated. At time T2 reflected in FIG. 7, the host computing device 102(1) determines that data block 602 require migration and moves a copy of the data block 602 and associated context metadata 604 from zone 600 to zone 700. The host computing device 102(1) also frees zone 600, such as by adding to free zone list 126.

Additionally, the host computing device 102(1) updates the entry 608(1) of the in-core ZNS mapping table 220(1) to replace the physical zone number of "1420" corresponding to zone 600 with the physical zone number "1360" corresponding to zone 700. If the host computing device 102(2) receives a read request for zone 600 after time T2 but before time T3, the checksum 606 will still be valid although the data block 602 has been moved and the entry 608(2) of the in-core ZNS mapping table 220(2) is stale.

Figure 8:
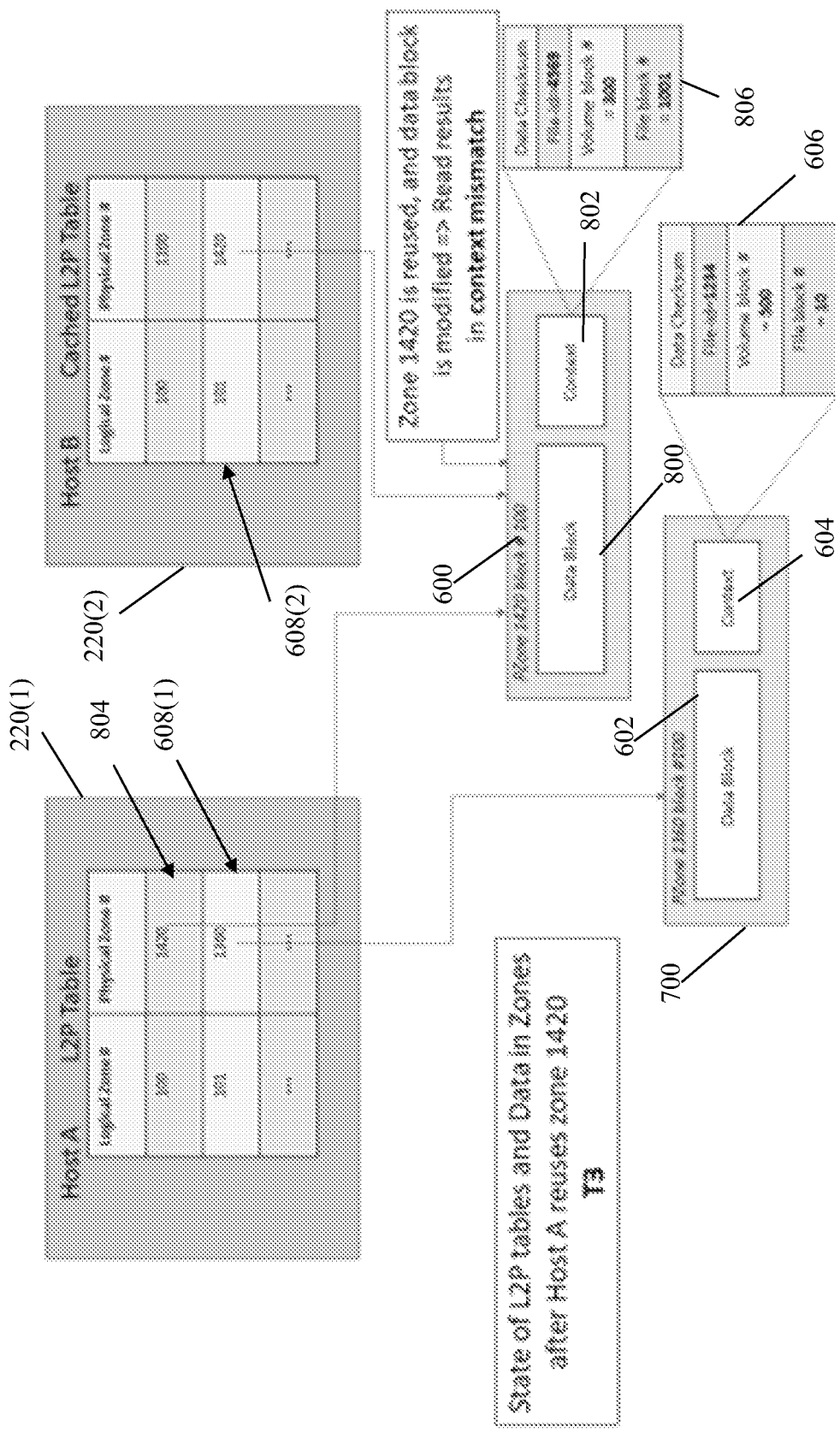
FIG. 8 is a block diagram of an additional exemplary state of the in-core ZNS mapping tables of two host devices subsequent to reuse by one of the host devices of the exemplary zone of FIG. 6.

Referring to FIG. 8, a block diagram of an additional exemplary state of the in-core ZNS mapping tables 220(1) and 220(2) of host computing devices 102(1) and 102(2), respectively, subsequent to reuse by the host computing device 102(1) of the zone 600 is illustrated. At time T3 reflected in FIG. 8 in this example, the host computing device 102(1) reuses the zone 600 by inserting data block 800 and associated context metadata 802 into the zone 600. The host computing device 102(1) also updates the entry 804 in the in-core ZNS mapping table 220(1) to reflect that logical zone number "100" is mapped to physical zone number "1420" corresponding to zone 600.

Accordingly, if the host computing device 102(2) receives a read request for logical zone number "101", the checksum 806 will be invalid. There will be a context mismatch because the checksum 806 will not match the corresponding information included with the write request (i.e., that corresponds to checksum 606). Accordingly, the host computing device 102(2) will be prompted to refresh the in-core ZNS mapping table 220(2) in this example, which will cause the physical zone number "1420" to be replaced by the physical zone number "1360" corresponding to zone 700. In a subsequent check, the information associated with the read request will match the checksum 606. Since the checksum is valid, the data block 602 will be returned in response to the read request.

As described and illustrated by way of the examples herein, this technology allows multiple host computing devices coupled to a dual-port SSD to efficiently share resources and metadata information regarding utilization of, and contents stored on, the dual-port SSD. This technology utilizes lazy synchronization of ZNS mapping tables to efficiently update stored translations that may have changed as a result of a data migration by another host coupled to the dual-port SSD. Accordingly, resources are managed more effectively with this technology, which reduces data fabric bandwidth and improves data storage network performance.

Figure 9:
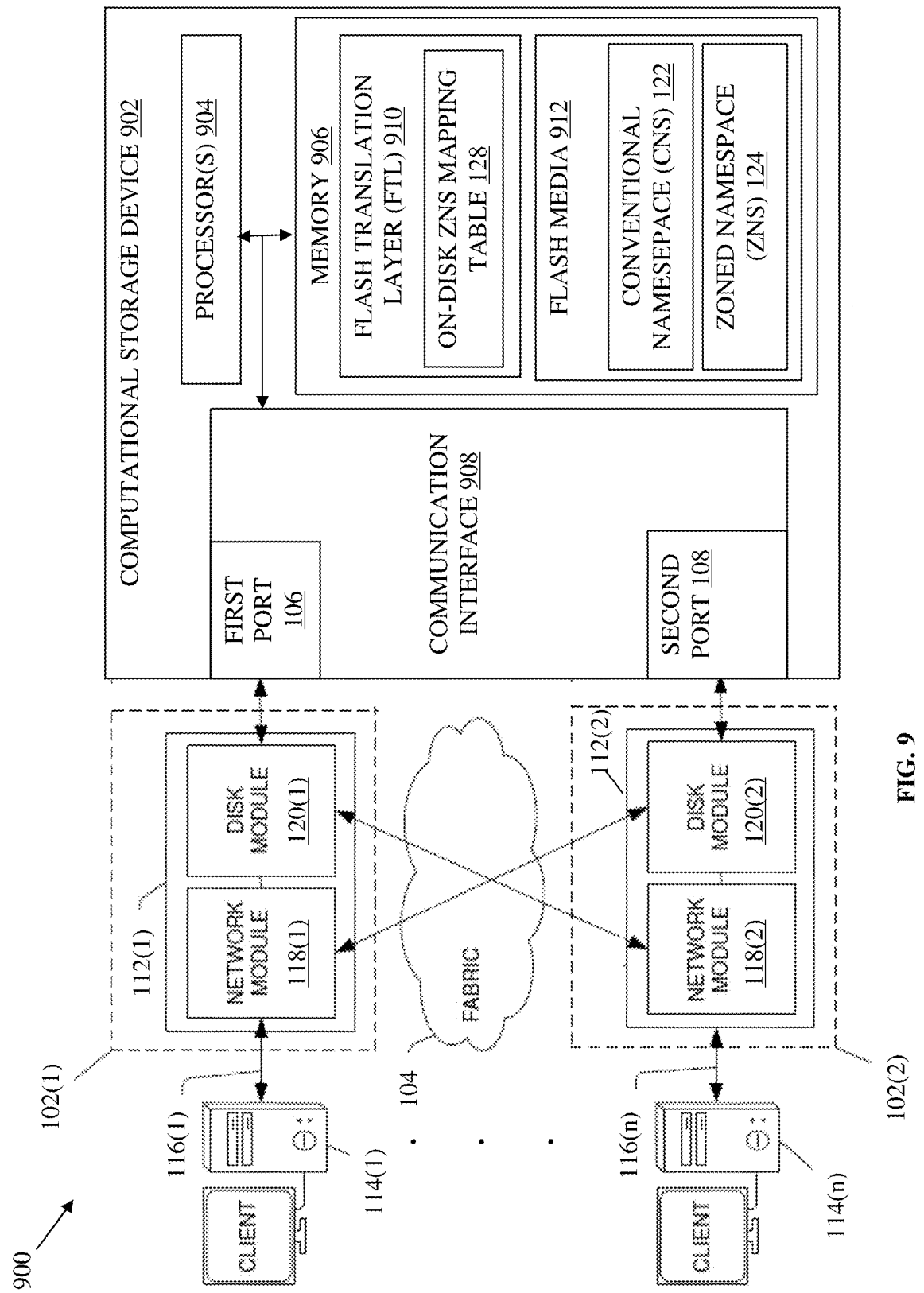
FIG. 9 is a block diagram of another network environment with exemplary host devices coupled to a computational storage device.

Referring to FIG. 9, a block diagram of a network environment 900 with the host computing devices 102(1) and 102(2) coupled to a computational storage device 902 is illustrated. In this example, the computational storage device 902 is a dual-port SSD that hosts computational logic, referred to herein as processor(s) 904, coupled to a memory 906 (e.g., DRAM), and a communication interface 908, which includes the first port 106 and the second port 108. The memory 906 includes an FTL 910 and flash media 912 (e.g., not—and (NAND) flash memory).

In this example, the FTL 910 includes the on-disk ZNS mapping table 128 and the flash media 912 includes the CNS 122 and ZNS 124. The host computing devices 102(1) and 102(2) do not include a host FTL or in-core ZNS mapping tables. Instead, the host computing devices 102(1) and 102(2) interface with the FTL 910, which manages the processing of storage operations to the flash media 912. Accordingly, there is a single instance of the FTL 910 hosted by the dual-port computational storage device 902 hosting a single on-disk ZNS mapping table 128.

Each of the host computing devices 102(1) and 102(2) sends storage operations or requests through different paths via the fabric 104, which arrive at the single FTL 910 instance. Accordingly, the network environment 900 advantageously facilitates access by the host devices 102(1) and 102(2) to the computational storage device 902 without requiring synchronization of any logical-to-physical mapping tables between the host computing devices 102(1) and 102(2).

Figure 10:
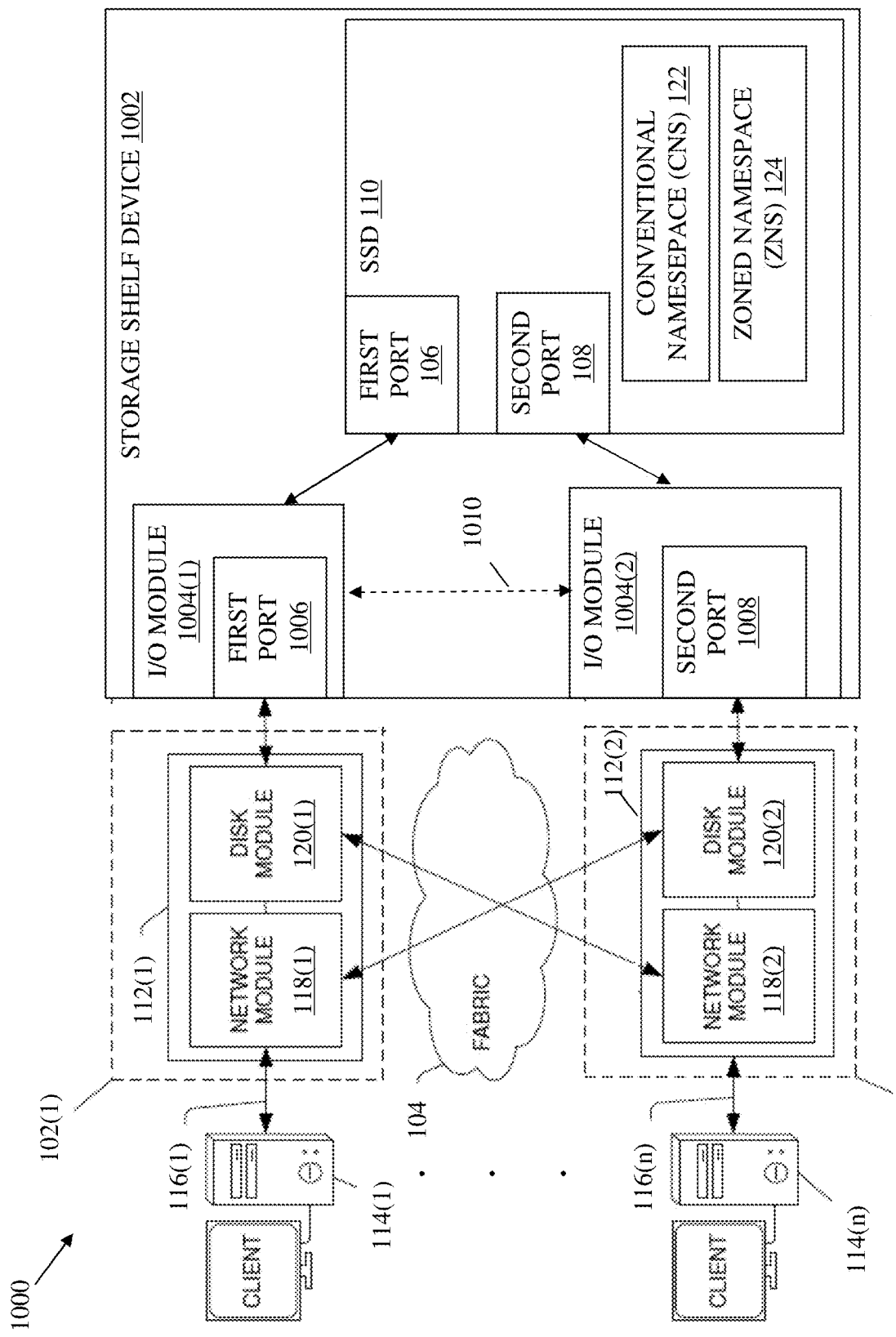
FIG. 10 is a block diagram of yet another network environment with exemplary host devices coupled to a dual-port SSD via a computational storage shelf device.

Referring to FIG. 10, a block diagram of a network environment 1000 with host computing devices 102(1) and 102(2) coupled to the dual-port SSD 110 via a computational storage shelf device 1002 is illustrated. The storage shelf device 1002 in this example includes I/O modules 1004(1) and 1004(2) that have a first port 1006 and a second port 1008, respectively. The first port 1006 and the second port 1008 are coupled to the host computing devices 102(1) and 102(2), respectively, via the data fabric 104 and/or the disk modules 120(1) and 120(2), respectively. The I/O modules 1004(1) and 1004(2) are coupled together via a remote direct memory access (RDMA) path 1010 to provide redundancy and fault tolerance and execute FTL logic described and illustrated in more detail below.

Figure 11:
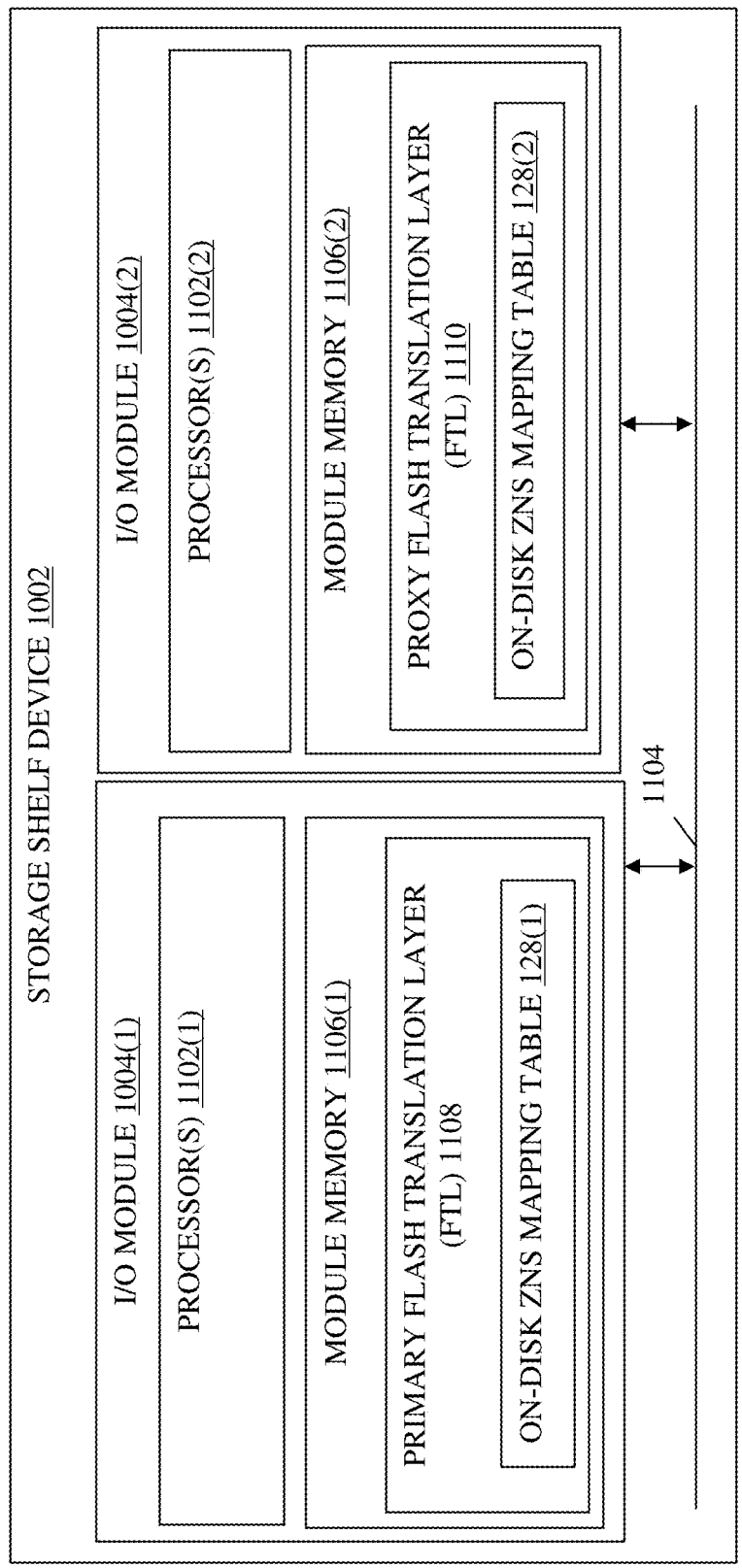
FIG. 11 is a block diagram of an exemplary computational storage shelf device.

Referring to FIG. 11, a block diagram of the storage shelf device 1002 is illustrated. In this example, the storage shelf device 1002 includes the I/O modules 1004(1) and 1004(2) and computational logic within each of the I/O modules 1004(1) and 1004(2), referred to herein as processor(s) 1102(1) and 1102(2), respectively, coupled together via a bus 1104 or other communication link. The processor(s) 1102(1) and 1102(2) can include one or more general purpose processors with one or more processing cores, configurable hardware logic (e.g., FPGA and/or ASIC), and/or any combination thereof, for example, and other types of computational logic can also be used. The processor(s) 1102(1) and 1102(2) may execute programmed instructions for any number of the functions described and illustrated in detail below.

The I/O modules 1004(1) and 1004(2) are configured to interface with the data fabric 104 via the first port 1006 and the second port 1008, respectively, to receive storage operations issued by the host computing device 102(1) and 102(2). In this particular example, the I/O modules 1004(1) and 1004(2) include module memory 1100(1) and 1100(2), respectively, which store the programmed instructions executed by the processor(s) 1102(1) and 1102(2), respectively, for one or more aspects of the present technology as described and illustrated herein, although some or all of the programmed instructions could be stored elsewhere. A variety of different types of memory storage devices, such as RAM, ROM, flash memory, or other computer readable medium which is read from and written to by a magnetic, optical, or other reading and writing system that is coupled to the processor(s) 1102(1) and 1102(2), can be used for the module memory 1106(1) and 1106(2).

The module memory 1106(1) includes a primary FTL 1108 and the module memory 1106(2) includes a proxy FTL 1110 in this example, each of which includes an on-disk ZNS mapping table 128(1) and 128(2), respectively. Generally, the on-disk ZNS mapping table 128(2) is a copy of the on-disk ZNS mapping table 128(1), and each of the on-disk ZNS mapping tables 128(1) and 128(2) is updated by the primary FTL 1108.

The primary FTL 1108 handles read/write storage operations, and modifies the on-disk mapping tables 128(1) and 128(2) as required, and the proxy FTL 1110 handles only read storage operations locally by utilizing the on-disk ZNS mapping table 128(2). If a write request arrives at the proxy FTL 1110, the proxy FTL 1110 forwards the request to the primary FTL 1108 over the internal RDMA path 1010. The RDMA path 1010 also is utilized by the primary FTL 1108 to update the on-disk ZNS mapping table 128(2) whenever the primary FTL 1108 modifies the on-disk ZNS mapping table 128(1).

Figure 12:
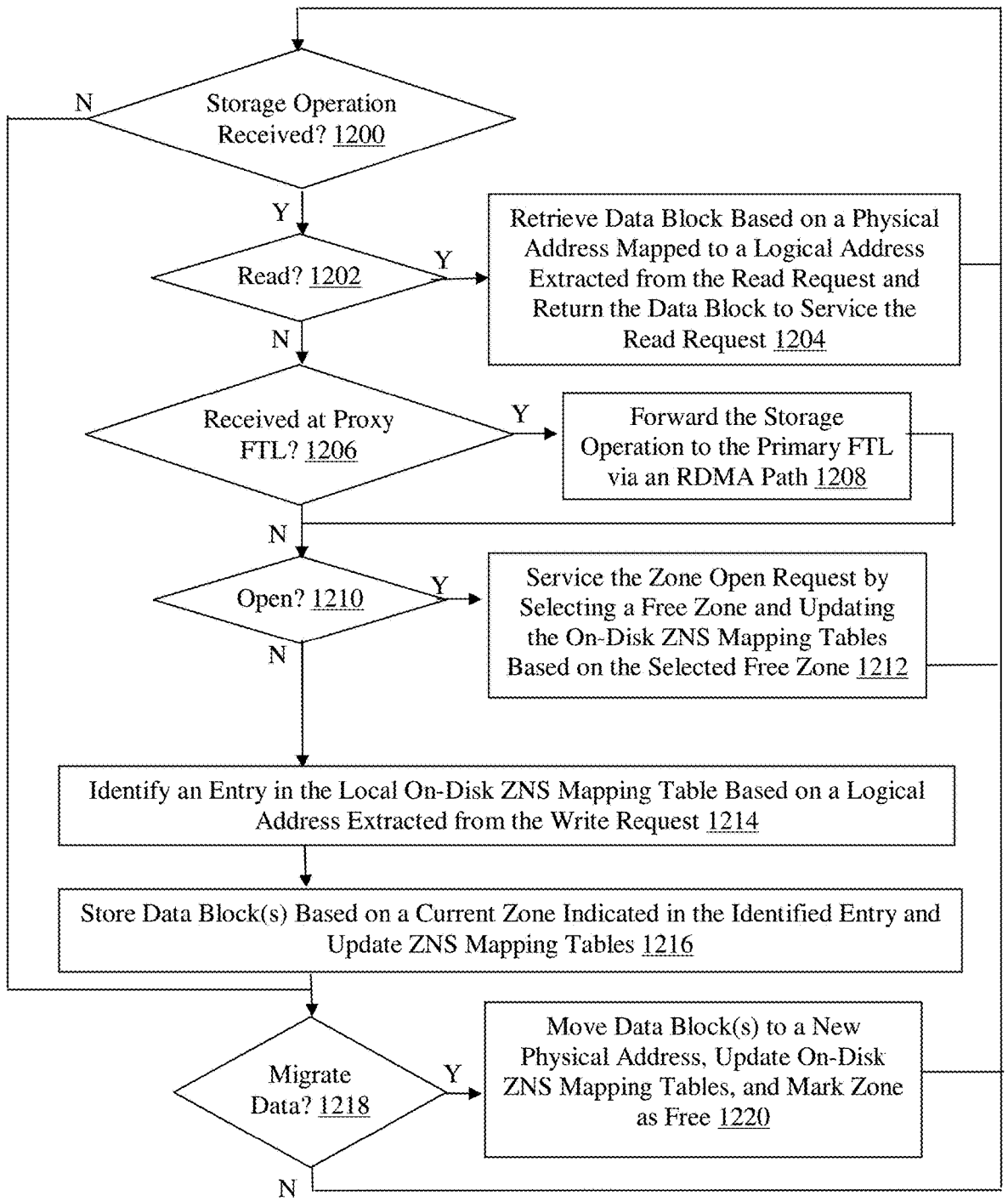
FIG. 12 is a flowchart of an exemplary method for processing storage operations directed to a dual-port SSD accessible by multiple host devices via a computational storage shelf device.

Referring to FIG. 12, a flowchart of an exemplary method for processing storage operations directed to the dual-port SSD 110 accessible by the host computing devices 102(1) and 102(2) via the computational storage shelf device 1002 is illustrated. In step 1200 in this example, the storage shelf device 1002 determines whether a storage operation is received at one of the primary FTL 1108 or the proxy FTL 1110, such as described and illustrated in more detail above with reference to step 304 of FIG. 3, for example. If the storage shelf device 1002 determines that a storage operation has been received, then the Yes branch is taken to step 1202.

In step 1202, the storage shelf device 1002 determines whether the received storage operation is a read request, such as described and illustrated in more detail above with reference to step 306 of FIG. 3, for example. If whichever of the primary FTL 1108 or the proxy FTL 1110 at which the storage operation was received determines that the storage operation is a read request, then the Yes branch is taken to step 1204.

In step 1204, the storage shelf device 1002 retrieves a data block based on a physical address mapped to a logical address extracted from the read request and returns the retrieved data block, such as to a requesting one of the client devices 114(1)-114(n), in order to service the read request, such as described and illustrated in more detail earlier with reference to step 408 of FIG. 4, for example. If the read request is received by the primary FTL 1108 then the mapping in the on-disk ZNS mapping table 128(1) is consulted to extract the physical address and, if the read request is instead received by the proxy FTL 1110, then the mapping in the on-disk ZNS mapping table 128(2) is consulted to extract the physical address.

Since the mapping is not modified to service the read request, the read request is serviced by whichever of the primary FTL 1108 or the proxy FTL 1110 received the read request, without transferring any information via the RDMA path 1010. Subsequent to servicing the read request, the storage shelf device 1002 proceeds back to step 1200 in this example. However, if the storage shelf device 1002 determines in step 1202 that the received storage operation is not a read request, then the No branch is taken to step 1206.

In step 1206, the storage shelf device 1002 determines whether the storage operation is received at the proxy FTL 1110. If the storage shelf device 1002 determines that the storage operation is received at the proxy FTL 1110, then the Yes branch is taken to step 1208.

In step 1208, the proxy FTL 1110 of the storage shelf device 1002 forwards the storage operation to the primary FTL 1108 via the RDMA path 1010. In this particular example, if the received storage operation is not a read request, then it is a zone open request or a write request requiring modification of ZNS mapping table contents. At least in part by forwarding the storage operation to the primary FTL 1108, synchronization between the primary FTL 1108 and the proxy FTL 1110 can be avoided. Subsequent to forwarding the storage operation in step 1208 or if the storage shelf device 1002 determines in step 1206 that the storage operation is not received at the proxy FTL 1110 (and is therefore received at the primary FTL 1108) and the No branch is taken, then the storage shelf device 1002 proceeds to step 1210.

In step 1210, the primary FTL 1108 of the storage shelf device 1002 determines whether the storage operation received locally or via the RDMA path 1010 is a zone open request, such as described and illustrated in more detail above with reference to step 308 of FIG. 3. If the primary FTL 1108 determines that the storage operation is a zone open request, then the Yes branch is taken to step 1212.

In step 1212, the primary FTL 1108 of the storage shelf device 1002 services the zone open request by selecting a free zone and updating the on-disk ZNS mapping tables 128(1) and 128(2) based on the selected free zone, such as described and illustrated in more detail above with reference to step 310 of FIG. 3 for example. The primary FTL 1108 updates the on-disk ZNS mapping table 128(2) via the RDMA path 1010 in this example. Optionally, the primary FTL 1108 can select the zone from a free zone list maintained locally, although other methods of selecting the free zone can also be used in other examples.

Subsequent to servicing the zone open request, the storage shelf device 1002 proceeds back to step 1200 in this example. However, if the primary FTL 1108 determines in step 1210 that the storage operation is not a zone open request, then the storage operation is a write request and the No branch is taken to step 1214.

In step 1214, the primary FTL 1108 of the storage shelf device 1002 identifies an entry in the local on-disk ZNS mapping table 128(1) based on a logical address extracted from the write request 1214. The entry can be identified as described and illustrated in more detail earlier with reference to step 312 of FIG. 3, for example, although other methods for identifying the entry can also be used in other examples.

In step 1216, the primary FTL 1108 of the storage shelf device 1002 stores data block(s) and metadata associated with the write request based on a current zone indicated in the identified entry and an offset determined from the logical address, for example. The primary FTL 1108 also updates state information associated with the identified entry in the on-disk ZNS mapping tables 128(1) and 128(2). The state information allows the primary FTL 1108 to know when the zone has been completely written and can be closed, for example. The on-disk ZNS mapping table 128(2) is updated by the primary FTL 1108 via the RDMA path 1010 in this example. Subsequent to step 1216, or if the storage shelf device 1002 determines in step 1200 that a storage operation has not been received and the No branch is taken, then the storage shelf device 1002 proceeds to step 1218.

In step 1218, the primary FTL 1108 of the storage shelf device 1002 determines whether any data requires migration, such as described and illustrated in more detail earlier with reference to step 316 of FIG. 3 for example. In this example, only the primary FTL 1108 is configured to be capable of data movement while executed concurrently with the primary FTL 1108. If the primary FTL 1108 determines that data requires movement, then the Yes branch is taken to step 1220.

In step 1220, the primary FTL 1108 of the storage shelf device 1002 moves data block(s), and optionally associated metadata, to a new physical address, updates the on-disk ZNS mapping tables 128(1) and 128(2), to reflect the updated mapping of the logical associated with the data block(s) to the new physical address, and marks the associated zone as free, such as described and illustrated in more detail earlier with reference to step 318 of FIG. 3. In this example, the on-disk ZNS mapping table 128(2) is again updated by the primary FTL 1108 via the RDMA path 1010. Subsequent to moving the data block(s) in step 1220, or if the storage shelf device 1002 determines in step 1218 that no data currently requires migration and the No branch is taken, then the storage shelf device 1002 proceeds back to step 1200 in this example.

Accordingly, in this example, a computational storage shelf device is advantageously utilized to reduce the overhead required to maintain logical-to-physical mappings and other metadata regarding data stored in a ZNS of a dual-port SSD accessible to multiple host computing devices. By placing the FTL at the storage shelf devices, and utilizing primary and proxy devices, this technology provides efficient servicing of storage operations while utilizing reduced resources.

Having thus described the basic concept of the invention, it will be rather apparent to those skilled in the art that the foregoing detailed disclosure is intended to be presented by way of example only, and is not limiting. Various alterations, improvements, and modifications will occur and are intended to those skilled in the art, though not expressly stated herein. These alterations, improvements, and modifications are intended to be suggested hereby, and are within the spirit and scope of the invention. Additionally, the recited order of processing elements or sequences, or the use of numbers, letters, or other designations therefore, is not intended to limit the claimed processes to any order except as may be specified in the claims. Accordingly, the invention is limited only by the following claims and equivalents thereto.

What is claimed is:

1. A method, comprising:
   inserting, by a primary flash translation layer (FTL) executing on a storage shelf computing device, a first entry into a first zoned namespace (ZNS) mapping table, wherein the first entry comprises an indication of a first zone selected in response to an open zone request;
   updating, by the primary FTL, a second ZNS mapping table of a proxy FTL to include a second entry comprising the indication of the first zone, wherein the second ZNS mapping table is hosted by the storage shelf computing device and coupled to the primary FTL via a remote direct memory access (RDMA) path;
   storing, by the primary FTL, first data associated with a write request in a ZNS of a dual-port solid state disk (SSD) at a location determined based on the first zone indicated in the entry, wherein the entry is identified based on a first logical address extracted from the write request.

2. The method of claim 1, further comprising storing, by the primary FTL, the first data in the ZNS via a first port of the dual-port SSD, wherein the proxy FTL is communicably coupled to a second port of the dual-port SSD.

3. The method of claim 1, further comprising receiving, by the primary FTL and via RDMA, one or more of the write request or the open zone request from the proxy FTL, wherein the one or more of the write request or the open zone request are received from a client device by the proxy FTL.

4. The method of claim 1, further comprising returning, by the primary FTL and in response to a read request, second data retrieved from the ZNS via a first port of the dual-port SSD based on a physical address mapped to a second logical address extracted from the read request.

5. The method of claim 1, further comprising migrating, by the primary FTL, the first data from the first zone to a second zone of the ZNS.

6. The method of claim 5, wherein the first zone is selected from a free zone list in response to the open zone request and the method further comprises adding, by the primary FTL, the first zone to the free zone list after the migration.

7. A non-transitory machine readable medium of a first input/output (I/O) module communicably coupled to a first port of a dual-port solid state disk (SSD), the non-transitory machine readable medium having stored thereon instructions comprising machine executable code that, when executed by at least one machine, causes the machine to:
   insert a first entry into a first zoned namespace (ZNS) mapping table, wherein the first entry comprises an indication of a first zone selected in response to an open zone request;

update a second ZNS mapping table of a proxy FTL to include a second entry comprising the indication of the first zone, wherein the proxy FTL is hosted by a second I/O module communicably coupled to a second port of the dual-port SSD;

store first data associated with a write request in a ZNS of the dual-port SSD at a location determined based on the first zone indicated in the entry, wherein the entry is identified based on a first logical address extracted from the write request.

8. The non-transitory machine readable medium of claim 7, wherein the first I/O module comprises a first processor, the second I/O module comprises a second processor, and the machine executable code, when executed by the machine, further causes the machine to update the second ZNS mapping table via remote direct memory access (RDMA).

9. The non-transitory machine readable medium of claim 7, wherein the machine executable code, when executed by the machine, further causes the machine to receive via remote direct memory access (RDMA) one or more of the write request or the open zone request from the second I/O module, wherein the one or more of the write request or the open zone request are received from a client device by the second I/O module.

10. The non-transitory machine readable medium of claim 7, wherein the machine executable code, when executed by the machine, further causes the machine to return, in response to a read request, second data retrieved from the ZNS via the first port based on a physical address mapped to a second logical address extracted from the read request.

11. The non-transitory machine readable medium of claim 7, wherein the machine executable code, when executed by the machine, further causes the machine to migrate the first data from the first zone to a second zone of the ZNS.

12. The non-transitory machine readable medium of claim 11, wherein the first zone is selected from a free zone list in response to the open zone request and the machine executable code, when executed by the machine, further causes the machine to add the first zone to the free zone list after the migration.

13. A storage shelf device, comprising:
a dual-port solid state disk (SSD) comprising a first port, a second port, and a zoned namespace (ZNS);
a first memory comprising a primary flash translation layer (FTL) communicably coupled to the first port; and
a first processor coupled to the first memory and configured to execute the primary FTL to cause the first processor to:
insert a first entry into a first ZNS mapping table in the first memory, wherein the first entry comprises an indication of a first zone selected in response to an open zone request;

update a second ZNS mapping table to include a second entry comprising the indication of the first zone, wherein the second ZNS mapping table is stored on a second memory comprising a proxy FTL communicably coupled to the second port; and store first data associated with a write request in the ZNS via the first port and at a location in the ZNS determined based on the first zone indicated in the entry, wherein the entry is identified based on a first logical address extracted from the write request.

14. The storage shelf device of claim 13, wherein the first processor is further configured to execute the primary FTL to further cause the first processor to update the second ZNS mapping table via a remote direct memory access (RDMA) path between the primary and proxy FTLs.

15. The storage shelf device of claim 13, further comprising a second processor coupled to the second memory and configured to execute the proxy FTL to cause the second processor to forward the write request to the primary FTL via remote direct memory access (RDMA), wherein the write request is received from a client device by the proxy FTL.

16. The storage shelf device of claim 13, further comprising a second processor coupled to the second memory and configured to execute the proxy FTL to cause the second processor to forward the open zone request to the primary FTL via remote direct memory access (RDMA), wherein the open zone request is received by the proxy FTL.

17. The storage shelf device of claim 13, wherein the first processor is further configured to execute the primary FTL to further cause the first processor to return, in response to a received read request, second data retrieved from the ZNS via the first port based on a physical address mapped to a second logical address extracted from the received read request.

18. The storage shelf device of claim 13, further comprising a second processor coupled to the second memory and configured to execute the proxy FTL to cause the second processor to return, in response to a received read request, second data retrieved from the ZNS via the second port based on a physical address mapped to a second logical address extracted from the received read request.

19. The storage shelf device of claim 13, wherein the first processor is further configured to execute the primary FTL to further cause the first processor to migrate the first data from the first zone to a second zone of the ZNS.

20. The storage shelf device of claim 19, wherein the first zone is selected from a free zone list in response to the open zone request and the first processor is further configured to execute the primary FTL to further cause the first processor to add the first zone to the free zone list after the migration.

* * * * *